L. A. NARES.
TIRE RACK FOR AUTOMOBILES.
APPLICATION FILED MAR. 18, 1915.
1,150,696.
Patented Aug. 17, 1915.
2 SHEETS—SHEET 2.
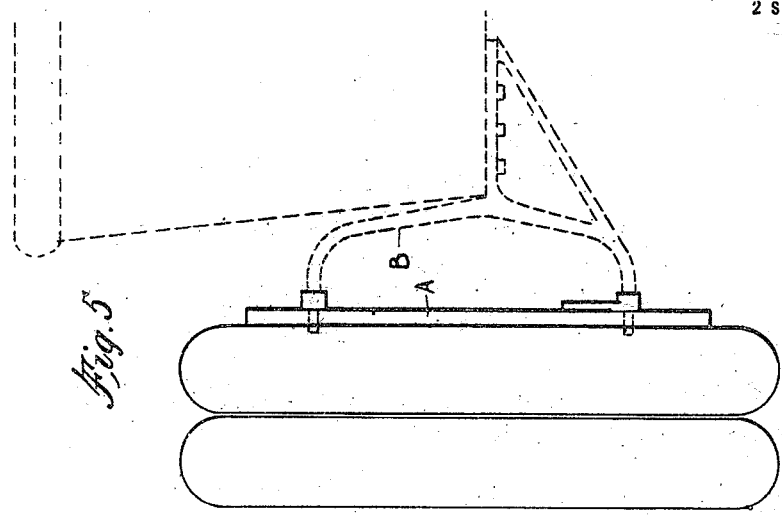
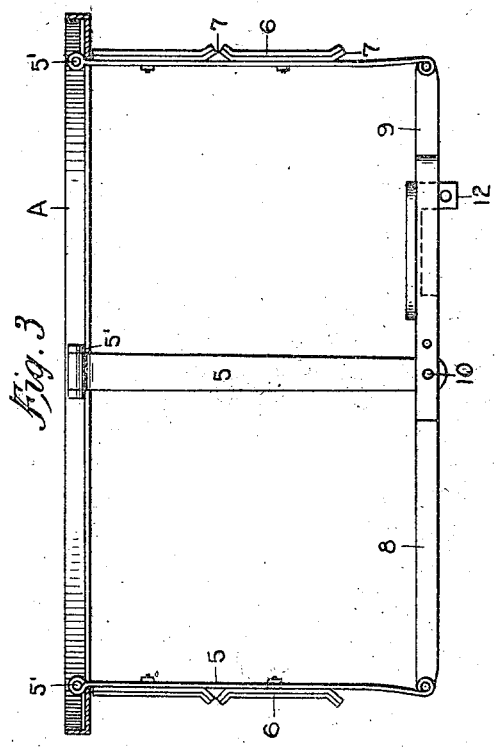
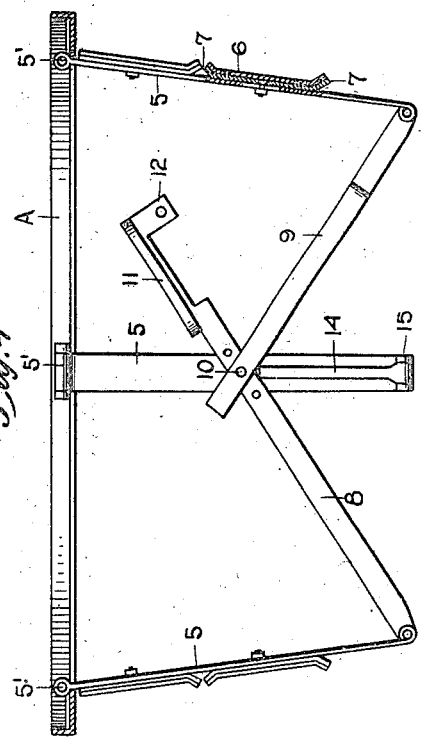
WITNESSES
INVENTOR
Llewelyn A. Nares
BY
ATTORNEYS

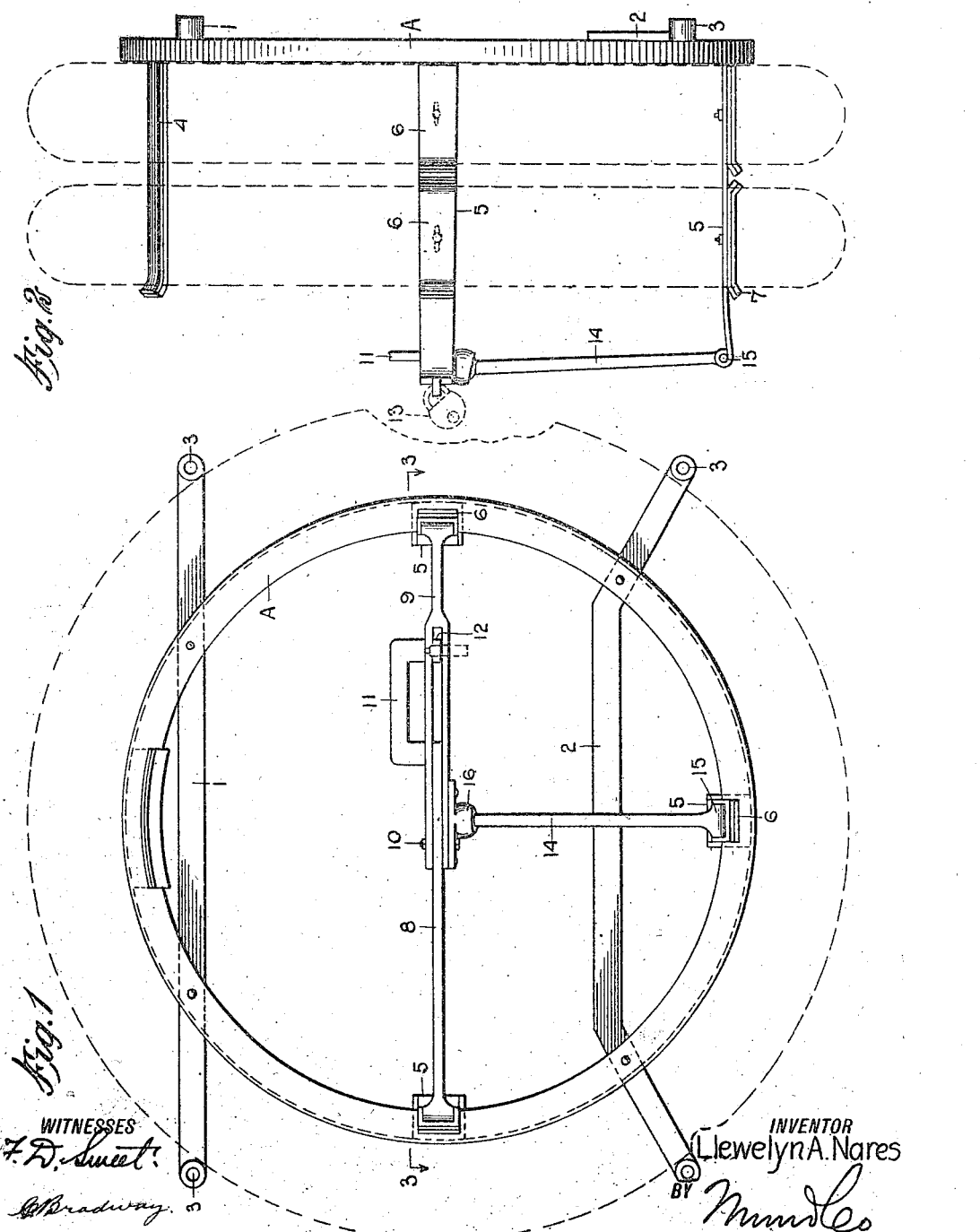
L. A. NARES.
TIRE RACK FOR AUTOMOBILES.
APPLICATION FILED MAR. 18, 1915.
1,150,696.
Patented Aug. 17, 1915.
2 SHEETS—SHEET 1.

UNITED STATES PATENT OFFICE.

LLEWELYN ARTHUR NARES, OF FRESNO, CALIFORNIA.

TIRE-RACK FOR AUTOMOBILES.

1,150,696.             Specification of Letters Patent.     Patented Aug. 17, 1915.

Application filed March 18, 1915. Serial No. 15,246.

*To all whom it may concern:*

Be it known that I, LLEWELYN A. NARES, a citizen of the United States, and a resident of Fresno, in the county of Fresno and State of California, have invented a new and Improved Tire-Rack for Automobiles, of which the following is a full, clear, and exact description.

This invention relates to a rack applied to an automobile body for the purpose of carrying extra tires.

The invention has for its general objects to improve and simplify the construction of automobile racks so as to be reliable and efficient in use, comparatively simple and inexpensive to manufacture and so designed that the tires can be easily and quickly locked or unlocked.

A further object of the invention is the provision of a rack for supporting one or more tires, the rack embodying a plurality of gripping members simultaneously engageable with or disengageable from the tires by means of novelly arranged links which serve to lock the tire-engaging arms in tire-holding position.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is an elevation of the rack showing the parts of the rack in tire-holding position; Fig. 2 is a side view of Fig. 1; Fig. 3 is a sectional view on the line 3—3, Fig. 1, with the tire-engaging members in locked position; Fig. 4 is a similar view with the said members in unlocked position; and Fig. 5 is an edge view showing the tires locked in the rack.

Referring to the drawings, A designates the base ring of the rack, which is fastened rigidly to the vehicle body by any suitable means, such as upper and lower cross bars 1 and 2, to which the ring is bolted or otherwise fastened, and the ends 3 of these rods are secured to suitable brackets B on the vehicle body, as shown in Fig. 5. Extending horizontally from and rigidly secured to the top of the ring A is a fixed arm 4 which sustains the weight of the extra tire or tires, and coöperating with this arm are several locking arms 5 which extend within and engage the tires at a plurality of points. In the present instance three of these movable arms 5 are employed, there being two side movable arms and a bottom movable arm. These movable arms, which are hinged at 5' on the ring A, have adjustable leather-faced seat elements 6 so shaped as to engage the rims of the demountable tires. Each seat comprises a metal strip having its ends 7 bent upwardly so as to engage the edges of the tire rim and prevent displacement of the latter in the rack. The side arms 5 are locked in tire-holding position by a pair of toggle links 8 and 9, which are hingedly connected at 10 by a bolt or equivalent means. These lengths are of such length that when they are in alinement the side arms will be parallel or in tire-holding position, but by throwing the links 8 and 9 inwardly, as shown in Fig. 4, the side arms 5 are drawn toward each other, thereby to release the tires.

To conveniently operate the toggle links the link 8 has an offset portion forming the grip 11 which lies above the plane of the link 9, the latter link being slotted to accommodate the inner end of the link 8, and also to permit a lug 12 to project through the link 9, and to this lug is applied a padlock 13 whereby the rack cannot be opened except by an authorized person. A link 14 is connected with the lower arm 5 and also with the toggle links to cause the lower arm to move inwardly or outwardly with the corresponding movement of the side arms 5. A hinge joint 15 connects the link 14 with the lower arm 5, while a ball and socket joint 16 connects the upper or inner end of the link 14 with the link 9. Since the toggle links move in a horizontal plane the upper end of the link 9 moves also in a horizontal plane, and consequently the lower end of the link 14 moves upwardly and thereby swings the lower arm 5 inwardly to release the tires. When the links are in locking position the tire-holding members 5 obviously cannot be moved inwardly out of engagement with the tires, the result being that the tires are locked in the rack and cannot be removed until the links are thrown from the position shown in Fig. 3 to that shown in Fig. 4. To lock and unlock the tires it is merely necessary to grip the handle 11 and throw the same inwardly or outwardly or in a direction from or toward the base ring A.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A tire-holding rack comprising a base ring, a fixed arm on the top of the ring and projecting laterally therefrom, three arms hinged on the ring and circumferentially disposed one from another approximately ninety degrees, tire-engaging means on all the arms, and connecting means between the hinged arms for simultaneously moving all of them outwardly into tire-engaging position, or inwardly into tire-releasing position.

2. A tire-carrying rack comprising a base element, means thereon for suspending the weight of the tire or tires to be carried, a pair of diametrically disposed tire-engaging arms movably mounted on the base element, a pair of toggle links connected with the arms, one of the links being slotted and the other link having an extremity extending through the slot from one side, a lock attached to the extremity at the side of the slotted link opposite from the side from which the said extremity enters the slot for preventing collapsing of the toggle links, and an upstanding loop on the lock-receiving link to form a handle for operating the toggle links.

3. A tire-carrying rack for automobiles, comprising a supporting structure, three tire-engaging elements movably mounted on the said structure, toggle links connecting two of the elements for throwing the same into or out of tire-engaging position, a link connected with the third element and hingedly connected with the said toggle links, whereby the third element moves into and out of tire-engaging position simultaneously with the other elements.

4. A tire rack for automobiles comprising a supporting structure, three tire-engaging arms hingedly mounted on the structure, links hingedly connected with the outer ends of the arms, a pivot connecting two of the links together, a ball and socket joint between the third link and one of the other links, and locking means for holding the links in a position with the arms engaged with the tires.

In testimony whereof I have signed my name to this specification in the presence of two subscribing witnesses.

LLEWELYN ARTHUR NARES.

Witnesses:
JOHN T. LEE,
L. MONTAGUE DREW.